(No Model.)
W. S. AUCHINCLOSS.
Averaging Machine.
No. 235,723. Patented Dec. 21, 1880.
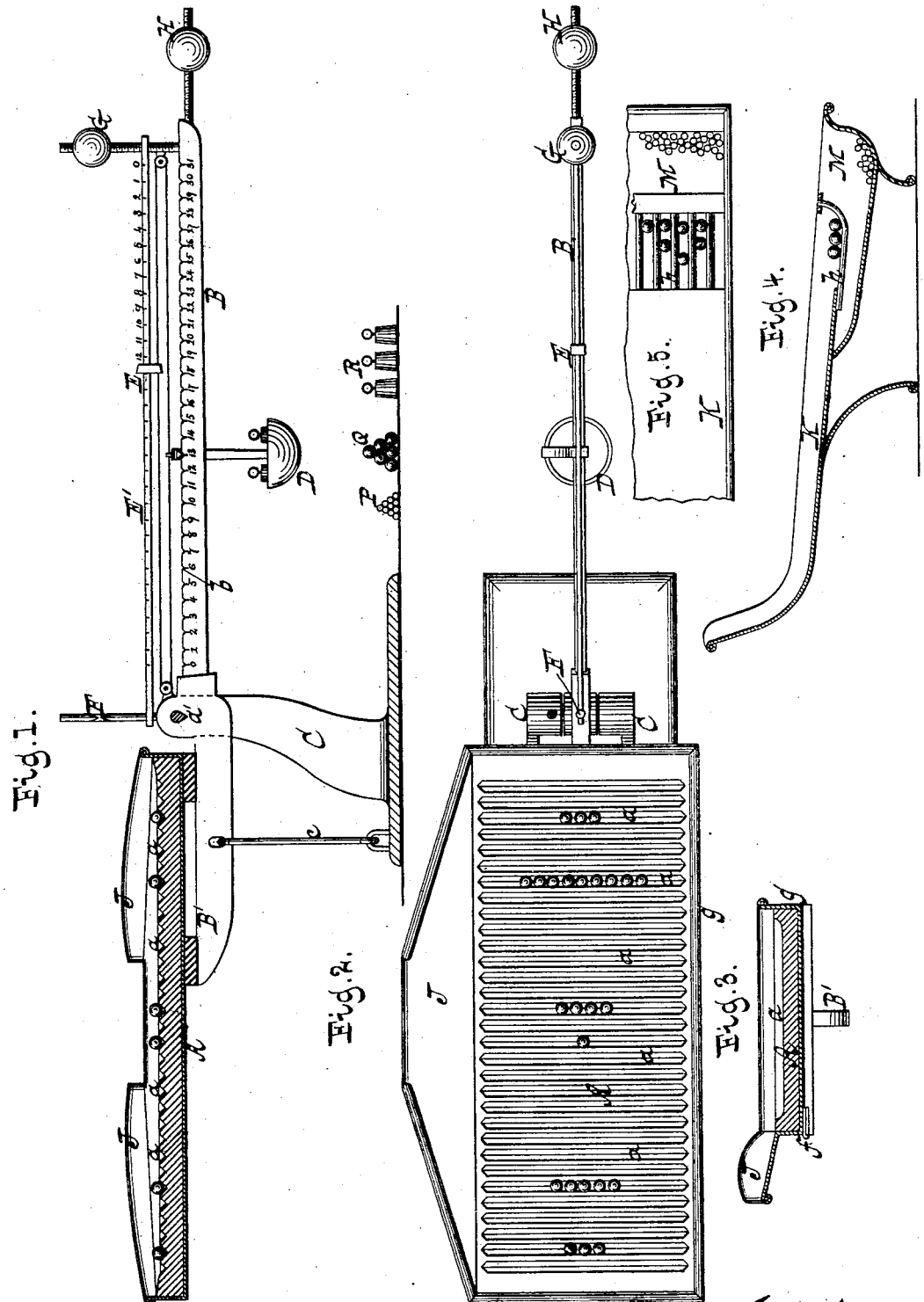
Witnesses.
Chas Wahlers.
William Miller
Inventor.
Wm S. Auchincloss
By Van Santvoord & Hauff
Attys.

UNITED STATES PATENT OFFICE.

WILLIAM S. AUCHINCLOSS, OF PHILADELPHIA, PENNSYLVANIA.

AVERAGING-MACHINE.

SPECIFICATION forming part of Letters Patent No. 235,723, dated December 21, 1880.

Application filed October 27, 1880. (No model.)

*To all whom it may concern:*

Be it known that I, WILLIAM S. AUCHINCLOSS, a citizen of the United States, residing at Philadelphia, in the county of Philadelphia and State of Pennsylvania, have invented new and useful Improvements in Averaging-Machines, of which the following is a specification.

This invention consists in a new method of determining the average of a series of given values—such, for instance, as the average date at which a number of payments fall due—or to determine questions of alligation, the means employed for this purpose consisting of a scale or balance and a series of weights bearing a suitable relation to each other, such as that of tens, hundreds, and thousands.

My invention also relates to the novel construction of the devices used in carrying out the method above stated, as will be hereinafter more fully described.

This invention is illustrated in the accompanying drawings, in which Figure 1 represents a sectional side view of a balance constructed according to my invention. Fig. 2 is a plan or top view. Fig. 3 is a transverse section of the platform. Fig. 4 is a longitudinal section of my device for separating the weights. Fig. 5 is a top view of the same.

Similar letters indicate corresponding parts.

The apparatus represented in the example shown in the drawings is constructed for determining the average date at which a number of payments fall due.

In these drawings, the letter A designates the platform of a balance or scale, which is provided with thirty-one transverse grooves, $a$. These grooves are, by preference, V-shaped and equidistant, and they represent the thirty-one days of the month. The platform rests upon an extension, B', of the scale-arm B, which has its fulcrum on a knife-edge bearing, $a'$, in a suitable stand or carrier, C, and is provided with thirty-one equidistant notches, $b$, (marked from 1 to 31.) Said scale-arm is also furnished with a suitable adjustment-weight, H, and a weight, G, to alter the position of the center of gravity of the scale.

From the scale-arm is suspended a scale-pan, D. The united weights of the scale-pan D and the weight E are just sufficient to counterbalance that of the platform A when they are together at the middle point of the scale-beam; also, the weight E is exactly equal to the weight of the empty scale-pan, so that when they stand at points equidistant from the center of the scale-beam their united gravity will be the same as if they were together at the central part. If the scale is empty, the scale-pan suspended from the notch $b$, (marked notch 1,) and the weight E is moved to the mark 1 on the bar E', the platform A is balanced by the scale-arm B and its appendages, and in order to preserve this equilibrium when the scale-pan D is moved on the scale-arm from the notch No. 1 to the notch No. 13, for instance, the weight E must also be moved on the bar E' to the mark No. 13. A link, $c$, limits the motion of the platform A and prevents overaction. The state of equilibrium is indicated by the pointers F.

The letters P, Q, and R represent weights bearing the relation to each other of tens, hundreds, and thousands.

The method of determining the average date is as follows: Assume that the purchases of any party during a certain month are as follows:

```
$300 worth on the 3d of the month.
 900   "    "   " 7th "   "    "
 400   "    "   " 15th "  "    "
 100   "    "   " 17th "  "    "
 500   "    "   " 26th "  "    "
 300   "    "   " 30th "  "    "
─────
$2,500
```

Place 3 of the Q or hundred balls in No. 3 groove on the platform A.
" 9 " " " " " " " " 7 " " " " "
" 4 " " " " " " " " 15 " " " " "
" 1 " " " " " " " " 17 " " " " "
" 5 " " " " " " " " 26 " " " " "
" 3 " " " " " " " " 30 " " " " "

$2,500

Then place two of the R or thousand weights and five of the Q weight in the scale-pan D, slide out the scale-pan to notch 13, and draw the counter-weight E from its initial point to mark 13 on bar E'; then the platform with its twenty-five Q weights will be exactly balanced, and the figure 13 on the scale-arm furnishes the average date on which all the payment will fall due.

If the month in which the purchases were made had thirty-one days and the terms of purchase were thirty days, then one must be deducted from the reading of the scale-beam.

If the purchases have been made during several consecutive months, the average for each month should first be found and then the average of the averages.

Weights ten times heavier than the weights R can be used to represent tens of thousands, and so on. The weights may be made either spherical, cylindrical, or conical, or any other suitable shape to fit the V-shaped grooves and to bring the center of gravity of each weight directly over the center-line of the groove.

Where occasion requires, weights of intermediate size can be employed. These weights can be made of various sizes by using materials of different specific gravity. They may also be distinguished by coating different sizes with paint, japan, silver, nickel, &c.

For other problems a greater or less number of transverse grooves and weights may be required.

When the solution of a problem has been completed, the separator K M is moved under the spout J of the platform A.

The platform is connected to its support B' by hinge-joints $f$, Fig. 3, so that its front edge, $g$, can be raised, and the weights contained on the platform can be dumped into the compartment K of the separator. The bottom of this compartment is inclined, and its lower end forms a grate, $h$, the bars of which are at such a distance apart that the small weights P pass through between them into the compartment M, while the large weights Q are retained in the compartment K.

If weights of more than two sizes are used on the platform A, the separator must be provided with a corresponding number of compartments. As shown in Fig. 4, the different weights collect at the lower ends of the different compartments, which extend one beyond the preceding one, so that the contents of each compartment can be readily reached.

In order to prevent noise, the compartments K M may be lined with felt, india-rubber, or other suitable material.

If desired, the counteracting-weight E may be connected to the scale-pan D by an endless cord running over pulleys, as shown in Fig. 1, so that whenever the position of the scale-pan is changed the weight E is moved automatically to the required position.

The platform A, instead of being hinged to its support, might be made to lift off and dump, or it might be firmly connected to its support in a transversely-inclined position and provided at its lower edge with a gate, which retains the different weights placed on the platform. In this case the weights are dumped when the gate is raised.

It will also be readily understood that the construction of the separator can be modified in various ways; but the form and construction which I have represented in the drawings appear to be best adapted for my purpose.

It must also be remarked that the scale-beam may be placed on the same side of the fulcrum as the platform, for the purpose of saving space.

In order to show how my machine can be used for a problem of alligation, I give the following:

A grocer mixes seventeen pounds of sugar worth thirteen cents with twenty-four pounds of sugar worth eight cents and fourteen pounds of sugar worth six cents.

Query: What is the mixture worth?
Solution:

Place 1 Q ball and 7 P balls in the groove 13.
" 2 " " " 4 " " " " 8.
" 1 " " " 4 " " " " 6.

Having done this, place five Q balls and five P balls in the scale-pan D. By moving out the scale-pan to No. 9 notch and drawing in the counter-weight E to its No. 9 notch, the scale will be found to be *in equilibrio*—that is, the mixture will be worth nine cents per pound. Other problems can be worked in a similar manner.

It will be readily understood that the scale-beam can be divided differently for the solution of different questions or problems; also, that the weights used on one side of the scale-beam may differ from those on the other side and still the equilibrium be maintained by employing them according to certain methods.

For the sake of convenience, the graduation for the scale-beam may be put on a separate piece of metal, which can be readily attached to or detached from the scale-beam. The section of the graduated portion can be made triangular, square, or polygonal, in order to accommodate all of the solutions required. It may also be desirable to place such a graduated staff over the scale-platform to direct the placing of the weights in certain grooves.

My averaging-machine may be further used for solving all questions or problems in direct and inverse proportion.

Thus: A pulley 16" diameter revolves at forty revolutions per minute. If it is belted to a pulley 8" diameter, at what speed will the latter pulley run?

Solution: Place four of the Q balls in No. 16 groove. Move the scale-pan D to notch No. 8 and fill it with Q balls until the balance is secured. Gives eight balls; gives answer of eighty revolutions per minute.

The averaging-machine may also be used for solving right-angled-triangle problems. Thus the P, Q, and R weights for the platform and a set of weights, P' Q' R', less than P, Q, and R by $28\frac{57}{100}$ per cent.

Problem: The base and perpendicular of a triangle are four feet and five feet. What is the length of the hypotenuse?

Place four Q balls in groove No. 4 and five Q balls in groove No. 5. Then place nine Q' balls in scale-pan D and slide the pan out to the balancing-point. It will be found to stand $6\frac{43}{100}$, which gives $6\frac{43}{100}$ feet as the length of the hypotenuse.

It is evident that, instead of using balls P' Q' R' of greater or less weight than P Q R, the revolving scale of the scale-arm can be graduated properly and the same balls P Q R used for all purposes in connection with the different graduations.

I therefore do not limit myself to the use of any single set of balls or single graduation of the scale or the platform, but adapt the same to every problem that presents itself for solution.

It is evident, therefore, that my averaging-machine applies to various mathematical computations.

The weights may be either liquid or solid weights. Thus mercury would form an excellent liquid for working the problems of this machine.

What I claim as new, and desire to secure by Letters Patent, is—

1. The combination, with a scale-arm, of a platform provided with a series of transverse grooves, substantially as and for the purpose shown and described.

2. The combination, with a scale-arm, of a platform provided with a series of transverse grooves, and with a spout for discharging the contents of said grooves, substantially as set forth.

3. The combination, with a scale-arm, of a platform provided with a series of transverse grooves and connected to its support by a hinge-joint, substantially as and for the purpose shown and described.

4. The combination, with a scale-arm and with a platform provided with transverse grooves, of a series of notches in the scale-arm, a scale-pan which can be made to engage with either of said notches, and an adjustable weight, E, to counteract the weight of the scale-pan, substantially as set forth.

5. The combination, with a scale-arm and with a platform provided with transverse grooves, of a series of notches in the scale-arm, a scale-pan which can be made to engage with either of said notches, an adjustable weight to counteract the weight of the scale-pan, and mechanism for setting the adjustable weight automatically whenever the position of the scale-pan on the scale-arm is changed, substantially as described.

In testimony whereof I have hereunto set my hand and seal in the presence of two subscribing witnesses.

WM. S. AUCHINCLOSS. [L. S.]

Witnesses:
JOSH. WM. BATES,
ABRAHAM JORDAN.